US007694141B2

(12) United States Patent
Lauter et al.

(10) Patent No.: US 7,694,141 B2
(45) Date of Patent: *Apr. 6, 2010

(54) EXTENDED AUTHENTICATED KEY EXCHANGE WITH KEY CONFIRMATION

(75) Inventors: Kristin E. Lauter, La Jolla, CA (US); Anton Mityagin, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 1134 days.

This patent is subject to a terminal disclaimer.

(21) Appl. No.: 11/190,374

(22) Filed: Jul. 26, 2005

(65) Prior Publication Data

US 2007/0028106 A1 Feb. 1, 2007

(51) Int. Cl.
*H04L 9/00* (2006.01)
(52) U.S. Cl. .................... 713/171; 380/44; 380/283; 713/176
(58) Field of Classification Search .................... None
See application file for complete search history.

(56) References Cited

U.S. PATENT DOCUMENTS

| | | | | |
|---|---|---|---|---|
| 6,122,736 | A * | 9/2000 | Vanstone et al. | 713/169 |
| 6,226,383 | B1 | 5/2001 | Jablon | |
| 6,487,661 | B2 * | 11/2002 | Vanstone et al. | 713/171 |
| 6,539,479 | B1 | 3/2003 | Wu | |
| 6,718,467 | B1 | 4/2004 | Trostle | |
| 6,993,651 | B2 | 1/2006 | Wray et al. | |
| 7,490,239 | B2 | 2/2009 | Beeson | |
| 2002/0062451 | A1 | 5/2002 | Scheidt et al. | |
| 2003/0081785 | A1 | 5/2003 | Boneh et al. | |
| 2003/0123655 | A1 | 7/2003 | Lambert et al. | |
| 2004/0081321 | A1 | 4/2004 | Struik | |
| 2006/0093138 | A1 | 5/2006 | Durand et al. | |

OTHER PUBLICATIONS

Law et al.; "An Efficient Protocol for Authenticated Key Agreement"; Technical Report CORR 98-05, Dept. of C&O, University of Waterloo, Canada, 1998; pp. 1-16.*
Boyd et al., "Elliptical Curve Based Password Authenticated Key Exchange Protocols", ACISP 2001, LNCS 2119, Springer-Verlag Berlin Heidelberg 2001, 2001, pp. 487-501.
Canetti et al., "Analysis of Key-Exchange Protocols and Their Use for Building Secure Channels", Proceedings of the International Conference on the Theory and Application of Cryptographic Techniques, LNCS, Springer-Verlag, vol. 2045, 2001, pp. 451-474.

(Continued)

*Primary Examiner*—Jung Kim
(74) *Attorney, Agent, or Firm*—Lee & Hayes, PLLC

(57) ABSTRACT

Extended authenticated key exchange with key confirmation is described. In one aspect, and before computing session keys to exchange information securely between an initiator and a responder, each party of the initiator and the responder, confirms whether the other party has received corresponding information to generate a valid session key. If either party determines that the other respective party has not received the corresponding information, the party terminates the extended authenticated key exchange with key confirmation protocol. Otherwise, when a party determines that the other party has received the corresponding information, the party generates a respective session key. In this manner, when both parties confirm that the other party has received the appropriate information for session key generation, both parties are assured that information can be exchanged between the parties securely using the session keys.

17 Claims, 6 Drawing Sheets

OTHER PUBLICATIONS

Shin et al., "Leakage-Resilient Authenticated Key Establishment Protocols", Advances in Cryptology ASIACRYPT, LNCS 2894, Springer Berlin/Heidelberg, 2003, pp. 155-173.

Vanstone, "Key Argument and Transport Protocol", PCT/CA 03/00317, Mar. 8, 2002.

* cited by examiner

EXTENDED AUTHENTICATED KEY EXCHANGE WITH KEY CONFIRMATION

BACKGROUND

Many standards documents governing the use of public key cryptography include specifications for Authenticated Key Exchange (AKE). AKE protocols involve two parties, an initiator and a responder. The goal of AKE is to allow the two parties to generate a secret session key, while authenticating the identities of the parties, so that the two parties can securely exchange information over a public channel with one another. AKE protocols such as Menezes-Qu-Vanstone (MQV) and an elliptic curve (EC) analogue (ECMQV) have recently been introduced. MQV and ECMQV are based on the well-known Diffie-Hellman key exchange protocol. The Diffie-Hellman key exchange protocol relies on the hardness of computing the discrete logarithm in a mathematical group. That is, if one takes an arbitrary number g known to everyone, picks an exponent, raises g to the power of this exponent, and announces the result, it becomes computationally infeasible for someone to determine which exponent was used.

Recent research has shown that the KEA, MQV, and ECMQV protocols are not secure against certain classes of attacks such as impersonation attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Extended authenticated key exchange with key confirmation is described. In one aspect, and before computing session keys to exchange information securely between an initiator and a responder, each party of the initiator and the responder, confirms whether the other party has received corresponding information to generate a valid session key. If either party determines that the other respective party has not received the corresponding information, the party terminates the extended authenticated key exchange with key confirmation protocol. Otherwise, when a party determines that the other party has received the corresponding information, the party generates a respective session key. In this manner, when both parties have confirmed that the other party has received the appropriate information for session key generation, both parties are assured that information can be exchanged between the parties securely using the session keys.

BRIEF DESCRIPTION OF THE DRAWINGS

In the Figures, the left-most digit of a component reference number identifies the particular Figure in which the component first appears.

FIG. 3 is a continuation of the exemplary operations shown in FIG. 2.

FIG. 4 is a continuation of the exemplary operations shown in FIGS. 2 and 3.

FIG. 5 is a continuation of the exemplary operations shown in FIGS. 2, 3, and 4.

DETAILED DESCRIPTION

Overview

Extended authenticated key exchange with key confirmation protocols KEA+C and EC-KEA+C provide extensions to existing Diffie-Hellman based AKE protocols. More particularly, KEA+C provides for extended authenticated key exchange with key confirmation using a multiplicative group of a prime field, and EC-KEA+C provides for extended authenticated key exchange with key confirmation using a group of points on an elliptic curve of prime order. KEA+C and EC-KEA+C are different from conventional AKE protocols in that KEA+C and EC-KEA+C generate secret session key values based on the identities of the parties that are exchanging the information. Additionally, these extension protocols provide for session key verification, which verifies that each of the respective parties (initiator and responder) has received enough information to generate a session key with which to establish a secure channel over which to exchange information between the parties. To these ends, KEA+C and EC-KEA+C implement three (3) passes of communication (i.e., communication exchanges or contacts) between the initiator and the responder to achieve provable security against impersonation.

The following sections describe these and other aspects of extended authenticated key exchange with key confirmation protocols (KEA+C and EC-KEA+C) in greater detail.

An Exemplary System

Although not required, extended authenticated key exchange with key confirmation is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
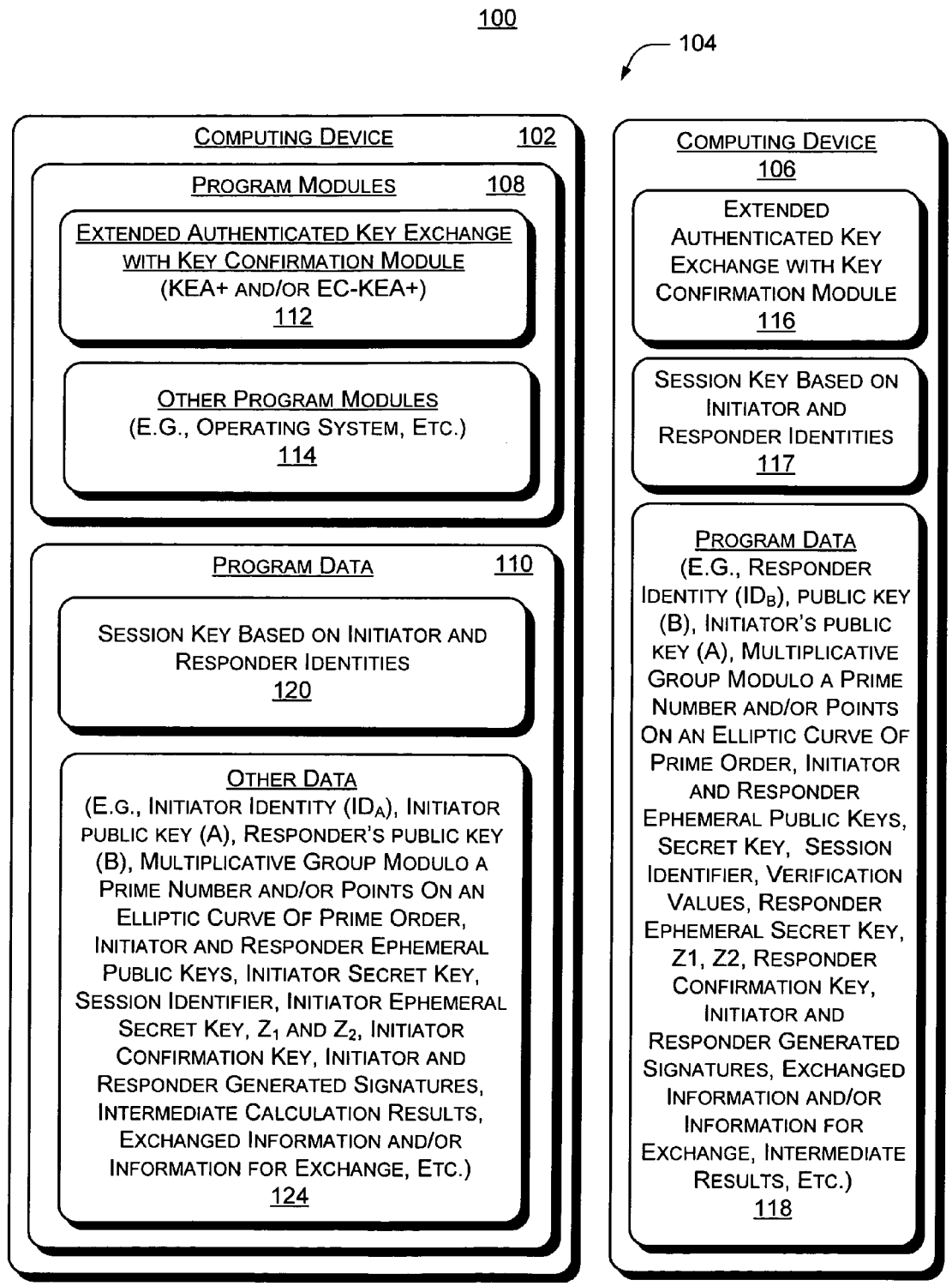
FIG. 1 shows an exemplary system for extended authenticated key exchange with key confirmation.

FIG. 1 shows an exemplary system 100 for extended authenticated key exchange with key confirmation. In this implementation, system 100 includes a general purpose computing device 102 coupled over network 104 to another general-purpose computing device 106. Computing devices 102 and 106 represent any type of computing device such as a personal computer, a laptop, a server, handheld or mobile computing device (e.g., a cellular phone, personal digital assistant), and/or so on. Computing device 102 includes program modules 108 and program data 110 to implement initiator operations of extended authenticated key exchange with key confirmation. For example, program modules 108 include, for example, extended authenticated key exchange with key confirmation module 112 and other program modules 114 such as an operating system, etc. Computing device 106 also includes program modules and program data to implement responder operations of extended authenticated key exchange with key confirmation. For example, computing device 106 includes extended authenticated key exchange with key confirmation module 116, a session key 117 that is based on initiator and responder identities, and other data 118.

Both initiator and responder extended authenticated key exchange with key confirmation modules 112 and 116 respectively implement KEA+C and/or EC-KEA+C operations. and $ID_B$), as well as initiator and responder public keys (A and B), are shown as respective portions of data 124 and 118.

We now describe exemplary KEA+C operations with respect to TABLE 1. (Exemplary EC-KEA+C operations are described in greater detail below with respect to TABLE 2).

TABLE 1

KEA + C
EXEMPLARY OPERATIONS FOR KEA + C

| Initiator | Responder |
|---|---|
| Identity: $ID_A$ | Identity: $ID_B$ |
| Secret key: a from $[1 \ldots q-1]$ | Secret key: b from $[1 \ldots q-1]$ |
| Public key: $A = g^a \bmod p$ | Public key: $B = g^b \bmod p$ |
| Responder's public key: B | Initiator's public key: A |
| Session identifier: sid | Session identifier: sid |
| Assumption: Responder's public key is valid | Assumption: Initiator's public key is valid |
| Pick x at random from $[1 \ldots q-1]$ | |
| Compute $X = g^x \bmod p$ | |
| Send X to the Responder | |
| | Receive X from Initiator |
| | Verify that $X^q = 1 \bmod p$; if "not", terminate |
| | Pick y at random from $[1 \ldots q-1]$ |
| | Compute $Y = g^y \bmod p$ |
| | Compute $Z_1 = A^y \bmod p$ |
| | Compute $Z_2 = X^b \bmod p$ |
| | Compute $L = H(0, Z_1, Z_2, ID_A, ID_B, sid)$ |
| | Compute $SIG_B = MAC_L(sid, ID_B, ID_A, Y, X)$ |
| Receive $(Y, SIG_B)$ from the Responder | Send $(Y, SIG_B)$ to Initiator |
| Verify that $Y^q = 1 \bmod p$; if not, terminate | |
| Compute $Z_1 = Y^a \bmod p$ | |
| Compute $Z_2 = B^x \bmod p$ | |
| Compute $L = H(0, Z_1, Z_2, ID_A, ID_B, sid)$ | |
| Verify that $SIG_B = MAC_L(sid, ID_B, ID_A, Y, X)$; if "not", terminate | |
| Compute $SIG_A = MAC_L(sid, ID_A, ID_B, X, Y)$ | |
| Send $SIG_A$ to the Responder | Receive $SIG_A$ from the Verifier |
| | Verify that $SIG_A = MAC_L(sid, ID_A, ID_B, X, Y)$; if "not", terminate |
| Compute a session key | Compute a session key |
| $K = H(1, Z_1, Z_2, ID_A, ID_B, sid)$ | $K = H(1, Z_1, Z_2, ID_A, ID_B, sid)$ |

KEA+C operations are directed to extended authenticated key exchange with key confirmation using a group of natural numbers modulo a fixed prime number to allow the two parties (i.e., an initiator and a responder) to determine an agreed secret session key that is based on initiator and responder identities, while authenticating identities of the parties. EC-KEA+C extended authenticated key exchange with key confirmation is executed in a group of points on an elliptic curve of prime order to determine an agreed secret session key based on initiator and responder identities, while authenticating identities of the parties. In both instances (i.e., KEA+C and EC-KEA+C), the respectively determined session keys 120 and 117 allow the initiator and responder to securely exchange information with one another over network 104 (e.g. a public channel). Session key 120 represents a session key determined by the initiator, and session key 117 represents a session key determined by the responder (these keys are supposed to be equal if the protocol is properly executed). KEA+C and EC-KEA+C protocols assume that the two parties have respective identities (initiator and responder identities) and public keys registered with a certificate of authority. Techniques for initiators and responders to register (and determine) respective identities and public keys with a certificate authority are well known. For purposes of exemplary illustration, initiator and responder identities ($ID_A$ Referring to TABLE 1, the first column represents initiator operations/properties that are associated with computer 102 ("the initiator 102"), and the second column represents responder operations/properties associated with computer 106 ("the responder 106"). The setup parameters for KEA+C are as follows. The value p is a fixed prime number. The parameter q is a fixed prime number that is a divisor of p−1. The value g is an element from $[1 \ldots p-1]$, which has order q; the powers of g can be viewed as a subgroup of order q of the multiplicative group $[1 \ldots p-1]$, H is an arbitrary standard cryptographic hash function used to map all possible binary strings to binary strings of a fixed length. Identities $ID_A$ and $ID_B$ are arbitrary binary strings comprising, for example, the names of the respective parties, addresses, and/or any other type of context information. MAC is an arbitrary standard cryptographic Message Authentication Code. MAC takes as input a binary string of a fixed length (called a key) and a binary string of an arbitrary length (called a message). The output of MAC is a binary string of a fixed length, called a tag or a signature of the message. A party sharing a secret MAC key can verify the signature of the message by re-computing the MAC and comparing original signature with the recomputed signature.

In one implementation, MAC is a function provided by respective ones of modules 112 and 116. In another implementation, MAC is a function respectively provided by other program modules of the initiator 102 and the responder 106.

As shown in TABLE 1, the initiator 102 utilizes secret key a; the responder 106 utilizes secret key b. Each of the initiator and the responder maintains a respective public key registered with a certificate authority (not shown). For example, the initiator 102 uses public key $A=g^a$, and the responder 106 uses public key $B=g^b$. At this point, it is assumed that the initiator's and responder's public keys are valid, meaning that they are elements from [1 ... p−1] which are of order q. This validity property can be checked by raising a public key to the power q to determine if the output is 1 modulo p. Each communicating party knows the other respective party's public key. That is, the initiator 102 has the responder's public key, and the responder 106 has the initiator's public key.

The session identifier sid should be different for each respective session between the initiator 102 and the responder 106. The value of the session identifier is arbitrary, being a function of the particular implementation utilized to generate the session identifier. Each of these setup parameters (e.g., p, q, g, H, MAC, $ID_A$, $ID_B$, a, b, A, B, and sid) is represented by respective portions of other data 124. Techniques to obtain and/or generate these setup parameters are well known.

KEA+C begins with the generation and exchange between the initiator 102 and responder 106 of respective ephemeral public keys X and Y. Initiator and responder ephemeral public keys are shown by respective portions of data 124 and 118. More particularly, and to generate the initiator ephemeral public key X, the initiator 102 randomly selects an exponent x, the initiator's ephemeral secret key, from [1 ... q−1]. The initiator 102 then computes the ephemeral public key X by raising the generator of the group g to the power x modulo p. The initiator 102 sends the ephemeral public key X to the responder 106.

Responsive to receiving the initiator's ephemeral public key X, the responder 106 verifies that X is valid by raising X to the power of q to determine whether the result is the identity element of the group, which is 1 modulo p. If this validity check fails, the responder 106 terminates the KEA+C protocol. If the initiator ephemeral public key X is determined to be valid, the responder 106 calculates an ephemeral public key Y by picking a ephemeral secret key y at random and computing the corresponding ephemeral public key $Y=g^y$ mod p. For purposes of exemplary illustration, a respective portion of program data 118 represents the responder ephemeral secret key y.

Before sending the responder's ephemeral public key Y to the initiator, the responder 106 first performs the following operations. The responder 106 computes a number $Z_1$ from the group by raising A (i.e., the long-term public key of the initiator) to the power of the responder's ephemeral secret key y, mod p. The responder 106 also computes $Z_2$, another number in the group, by raising the initiator's ephemeral public key X to the power of b (i.e., the long-term secret key of the responder 106), mod p. Next, the responder 106 generates secret confirmation key L by applying a hash function H to concatenated values 0, $Z_1$, $Z_2$, $ID_A$, $ID_B$, and sid. As described below, the responder's secret confirmation key L is used to verify that the parties (responder and initiator) have received the described communications to one another. In one implementation, the responder 106 generates secret confirmation key L by applying a hash function H to concatenated values 0, $Z_1$, $Z_2$, $ID_A$, and $ID_B$. The responder 106 applies the message authentication code MAC under secret confirmation key L to a message (sid, $ID_B$, $ID_A$, Y, X) to generate a signature $SIG_B$. The responder 106 sends ephemeral public key Y and $SIG_B$ to the initiator 102.

Responsive to receiving Y and $SIG_B$ from the responder 106, the initiator 102 determines whether the responder's ephemeral public key is valid. This is accomplished by raising Y to the power of q, mod p. If the responder's ephemeral public key is determined not be valid, the initiator 102 terminates the key exchange session. Otherwise, the initiator computes a number $Z_1$ from the group by raising Y (i.e., the ephemeral public key of the responder) to the power of the initiator's long-term secret key a, mod p. The initiator 102 also computes $Z_2$, another number in the group, by raising the responder's public key B to the power of x (i.e., the ephemeral secret key of the initiator 102), mod p. At this point, the initiator 102 generates a respective secret confirmation key L by applying a hash function H to concatenated values 0, $Z_1$, $Z_2$, $ID_A$, $ID_B$, and sid. As described below, the responder's secret confirmation key L is used to verify that the parties (responder and initiator) have received the described communications to one another. In one implementation, the responder 106 generates secret confirmation key L by applying a hash function H to concatenated values 0, $Z_1$, $Z_2$, $ID_A$, and $ID_B$. The initiator 102 applies the message authentication code MAC under secret confirmation key L to a message (sid, $ID_B$, $ID_A$, Y, and X) to determine whether the resulting signature is equal to signature $SIG_B$ (received from the responder 106). If the above check fails, the initiator 102 cannot be assured that the responder 106 has correctly received all of the information necessary to generate a session key 117 for use to exchange information securely with the initiator 102. In such a scenario, the initiator 102 terminates the key exchange session.

Otherwise, if the result of applying MAC under secret confirmation key L to a message (sid, $ID_B$, $ID_A$, Y, and X) does result in signature $SIG_B$, the initiator 102 computes a signature $SIG_A$ by applying the message authentication code MAC under secret confirmation key L to a message (sid, $ID_A$, $ID_B$, X, Y); note that the order of the values is now different from the one used in computing $SIG_B$. The initiator 102 sends a signature $SIG_A$ to the responder 106. The initiator 102 computes a session key K (session key 120) by hashing the concatenation of the following values: 1, $Z_1$, $Z_2$, $ID_A$, $ID_B$, and sid. In one implementation, the session key 120 is determined by hashing only a subset of the above-indicated five values, for example only 1, $Z_1$, $Z_2$, $ID_A$ and $ID_B$.

Responsive to receiving $SIG_A$ from the initiator 102, the responder 106 determines whether $SIG_A$, is valid. This is accomplished by applying the message authentication code MAC under secret confirmation key L to a message (sid, $ID_A$, $ID_B$, X, Y) to determine whether the resulting signature is equal to signature $SIG_A$. If the result of this operation does not result in signature $SIG_A$, the responder 106 cannot be assured that the initiator 102 has correctly received all of the information necessary to generate a session key 120 for use to exchange information securely with the responder 106. In such a scenario, the responder 106 terminates the key exchange session.

Otherwise, the responder computes a session key K (session key 117) by hashing the concatenation of the following values: 1, $Z_1$, $Z_2$, $ID_A$, $ID_B$, and sid (please note that in this scenario, $Z_1$ and $Z_2$ are values computed by the responder 106). At this point, the initiator 102 and the responder 106, having successfully generated respective session keys 120 and 117 (which should be equal provided that both parties properly execute the protocol), can exchange information securely using the generated session keys.

In view of the above, and in contrast to conventional key exchange scenarios, system 100 implements three rounds of communication between parties to verify that each of the respective parties has computed enough information to generate a respective session key 120 or 117. The initiator 102 and the responder 106 perform this session key confirmation process before exchanging any information using computed session keys. For purposes of exemplary illustration, respective portions of data 124 and 118 represent securely exchanged information and/or information for secure exchange.

EC-KEA+C

In reference to TABLE 2, we now describe exemplary operations for EC-KEA+C, which is elliptic curve-based extended authenticated key exchange with key confirmation protocol.

signature of the message by re-computing the MAC and comparing original signature with the recomputed signature.

As shown in TABLE 2, each party (the initiator 102 and the responder 106) has its own long-term secret key (a or b), which is a number from $[1 \ldots q-1]$. Each of the initiator and the responder maintains a respective public key registered with a certificate authority (not shown). For example, the initiator 102 uses public key A=aP, and the responder 106 uses public key B=bP. At this point, EC-KEA+C assumes that

TABLE 2

EXEMPLARY OPERATIONS FOR EC-KEA + C

| Initiator | Responder |
|---|---|
| Identity: $ID_A$ | Identity: $ID_B$ |
| Secret key: a from $[1 \ldots q-1]$ | Secret key: b from $[1 \ldots q-1]$ |
| Public key: A = aP | Public key: B = bP |
| Responder's public key: B | Initiator's public key: A |
| Session identifier: sid | Session identifier: sid |
| Assumption: Responder's public key is valid | Assumption: Initiator's public key is valid |
| Pick x at random from $[1 \ldots q-1]$ | |
| Compute X = xP | |
| Send X to the Responder | Receive X from Initiator |
| | Verify that X is in G; if "not", terminate |
| | Pick y at random from $[1 \ldots q-1]$ |
| | Compute Y = yP |
| | Compute $Z_1$ = yA |
| | Compute $Z_2$ = bX |
| | Compute L = $H(0, Z_1, Z_2, ID_A, ID_B, sid)$ |
| | Compute $SIG_B$ = $MAC_L(sid, ID_B, ID_A, Y, X)$ |
| Receive (Y, $SIG_B$) from the Responder | Send (Y, $SIG_B$) to Initiator |
| Verify that Y is in G; if not, terminate | |
| Compute $Z_1$ = aY | |
| Compute $Z_2$ = xB | |
| Compute L = $H(0, Z_1, Z_2, ID_A, ID_B, sid)$ | |
| Verify that $SIG_B$ = $MAC_L(sid, ID_B, ID_A, Y, X)$; if "not", terminate | |
| Compute $SIG_A$ = $MAC_L(sid, ID_A, ID_B, X, Y)$ | |
| Send $SIG_A$ to the Responder | Receive $SIG_A$ from the Verifier |
| | Verify that $SIG_A$ = $MAC_L(sid, ID_A, ID_B, X, Y)$; if "not", terminate |
| Compute a session key | Compute a session key |
| K = $H(1, Z_1, Z_2, ID_A, ID_B, sid)$ | K = $H(1, Z_1, Z_2, ID_A, ID_B, sid)$ |

Referring to TABLE 2, the first column represents initiation operations/properties associated with computer 102 (i.e., "initiator 102"), and the second column represents responder operations/properties associated with computer 106 (i.e., responder 106). The setup parameters for EC-KEA+C, which is elliptic curve-based extended authenticated key encryption protocol, are as follows. G is a group of points on an elliptic curve E of prime order. The elliptic curve is specified by an equation of the form $y^2=x^3+ax+b$. The group of points on the elliptic curve consists of ordered pairs (x, y) that satisfy this elliptic curve equation, and the identity element, which is a point at infinity. EC-KEA+C implements scalar multiplication in an elliptic curve group (i.e., the group operation is addition of points), rather than exponentiation operations such as those described above with respect to the KEA+C protocol.

The setup parameter q is a prime number, which represents the order, or size, of the group G. The value P is an element from G, which has order q, and H is an arbitrary cryptographic hash function. MAC is an arbitrary standard cryptographic Message Authentication Code. MAC takes as input a binary string of a fixed length (called a key) and a binary string of an arbitrary length (called a message). The output of MAC is a binary string of a fixed length, called a tag or a signature of the message. A party with a secret confirmation key can verify the the initiator's and responder's public keys are valid points on a specified elliptic curve. Additionally, each communicating party knows the other respective party's public key. That is, the initiator 102 has the responder's public key B, and the responder 106 has the initiator's public key A.

The session identifier sid should be different for each respective session between the initiator 102 and the responder 106. The value of the session identifier is arbitrary, being a function of the particular implementation utilized to generate the session identifier. Each of these setup parameters (e.g., p, q, g, H, MAC, $ID_A$, $ID_B$, a, b, A, B, and sid) is represented by respective portions of other data 124. Techniques to obtain and/or generate these setup parameters are well known.

KEA+C begins with the generation and exchange between the initiator 102 and responder 106 of respective ephemeral public keys X and Y. Initiator and responder ephemeral public keys are shown by respective portions of data 124 and 118. To generate the initiator ephemeral public key X, the initiator 102 randomly selects a scalar multiple x, the initiator's ephemeral secret key, from $[1 \ldots q-1]$. The initiator 102 then computes the ephemeral public key X by adding P to itself x times. The initiator 102 sends ephemeral public key X to the responder 106.

Responsive to receiving the initiator's ephemeral public key X, the responder 106 verifies that X is valid by verifying that X is in G. If this validity check fails, the responder 106 terminates the EC-KEA+C protocol. If the initiator ephemeral public key X is determined to be valid, the responder 106 calculates an ephemeral public key Y by picking a ephemeral secret key y at random and computing the corresponding ephemeral public key Y=yP. For purposes of exemplary illustration, a respective portion of program data 118 represents the responder ephemeral secret key y.

Before sending the responder's ephemeral public key Y to the initiator, the responder 106 first performs the following operations. The responder 106 computes an element $Z_1$ from the group by adding A (i.e., the long-term public key of the initiator) to itself y times. The responder 106 also computes $Z_2$, another element in the group, by adding. X to itself b times. Next, the responder 106 generates secret confirmation key L by applying a hash function H to concatenated values 0, $Z_1$, $Z_2$, $ID_A$, $ID_B$, and sid. The responder's secret confirmation key L is used to verify that the parties (responder and initiator) have received the described communications to one another. In one implementation, the responder 106 generates secret confirmation key L by applying a hash function H to concatenated values 0, $Z_1$, $Z_2$, $ID_A$, and $ID_B$. The responder 106 applies the message authentication code MAC under secret confirmation key L to a message (sid, $ID_B$, $ID_A$, X, Y) to generate a signature $SIG_B$. The responder 106 sends ephemeral public key Y and $SIG_B$ to the initiator 102.

Responsive to receiving Y and $SIG_B$ from the responder 106, the initiator 102 determines whether the responder's ephemeral public key is valid. This is accomplished by verifying that Y is in G. If the responder's ephemeral public key is determined not be valid, the initiator 102 terminates the key exchange session. Otherwise, the initiator computes an element $Z_1$ from the group by adding Y (i.e., the ephemeral public key of the responder) to itself a times. The initiator 102 also computes $Z_2$, another element in the group, by adding the responder's public key B to itself x (i.e., the ephemeral secret key of the initiator 102) times. At this point, the initiator 102 generates a respective secret confirmation key L by applying a hash function H to concatenated values 0, $Z_1$, $Z_2$, $ID_A$, $ID_B$, and sid. The responder's secret confirmation key L is used to verify that the parties (responder and initiator) have received the described communications to one another. In one implementation, the responder 106 generates secret confirmation key L by applying a hash function H to concatenated values 0, $Z_1$, $Z_2$, $ID_A$, and $ID_B$. The initiator 102 applies the message authentication code MAC under secret confirmation key L to a message (sid, $ID_B$, $ID_A$, Y, X) to determine whether the resulting signature is equal to signature $SIG_B$ (received from the responder 106). If the above check fails, the initiator 102 cannot be confident that the responder 106 has correctly received all of the information necessary to generate a session key 117 for use to exchange information securely with the initiator 102. In such a scenario, the initiator 102 terminates the key exchange session.

Otherwise, if the result of applying MAC under secret confirmation key L to a message (sid, $ID_B$, $ID_A$, Y, and X) does result in signature $SIG_B$, the initiator 102 computes a signature $SIG_A$ by applying the message authentication code MAC under secret confirmation key L to a message (sid, $ID_A$, $ID_B$, X, Y); note that the order of the values is now different from the one used in computing $SIG_B$. The initiator 102 sends a signature $SIG_A$ to the responder 106. The initiator 102 computes a session key K (session key 120) by hashing the concatenation of the following values: 1, $Z_1$, $Z_2$, $ID_A$, $ID_B$, and sid. In one implementation, the session key 120 is determined by hashing only a subset of the above-indicated five values, for example only 1, $Z_1$, $Z_2$, $ID_A$, $ID_B$.

Responsive to receiving $SIG_A$ from the initiator 102, the responder 106 determines whether $SIG_A$, is valid. This is accomplished by applying the message authentication code MAC under secret confirmation key L to a message (sid, $ID_A$, $ID_B$, X, Y) to determine whether the resulting signature is equal to signature $SIG_A$. If the result of this operation does not result in signature $SIG_A$, the responder 106 cannot be assured that the initiator 102 has correctly received all of the information necessary to generate a session key 120 for use to exchange information securely with the responder 106. In such a scenario, the responder 106 terminates the key exchange session.

Otherwise, the initiator computes a session key K (session key 117) by hashing the concatenation of the following values: 1, $Z_1$, $Z_2$, $ID_A$, $ID_B$, and sid (please note that in this scenario, $Z_1$ and $Z_2$ are values computed by the responder 106). At this point, the initiator 102 and the responder 106, having successfully generated respective session keys 120 and 117 (which are supposed to be equal provided that both parties properly execute the protocol), can exchange information securely using the generated session keys. In contrast to conventional key exchange scenarios, system 100 implements three rounds of communication between parties to verify that each of the respective parties has computed enough information to generate a respective session key 120 or 117. For purposes of exemplary illustration, respective portions of data 124 and 118 represent securely exchanged information and/or information for secure exchange.

Exemplary Procedure

Figure 2:
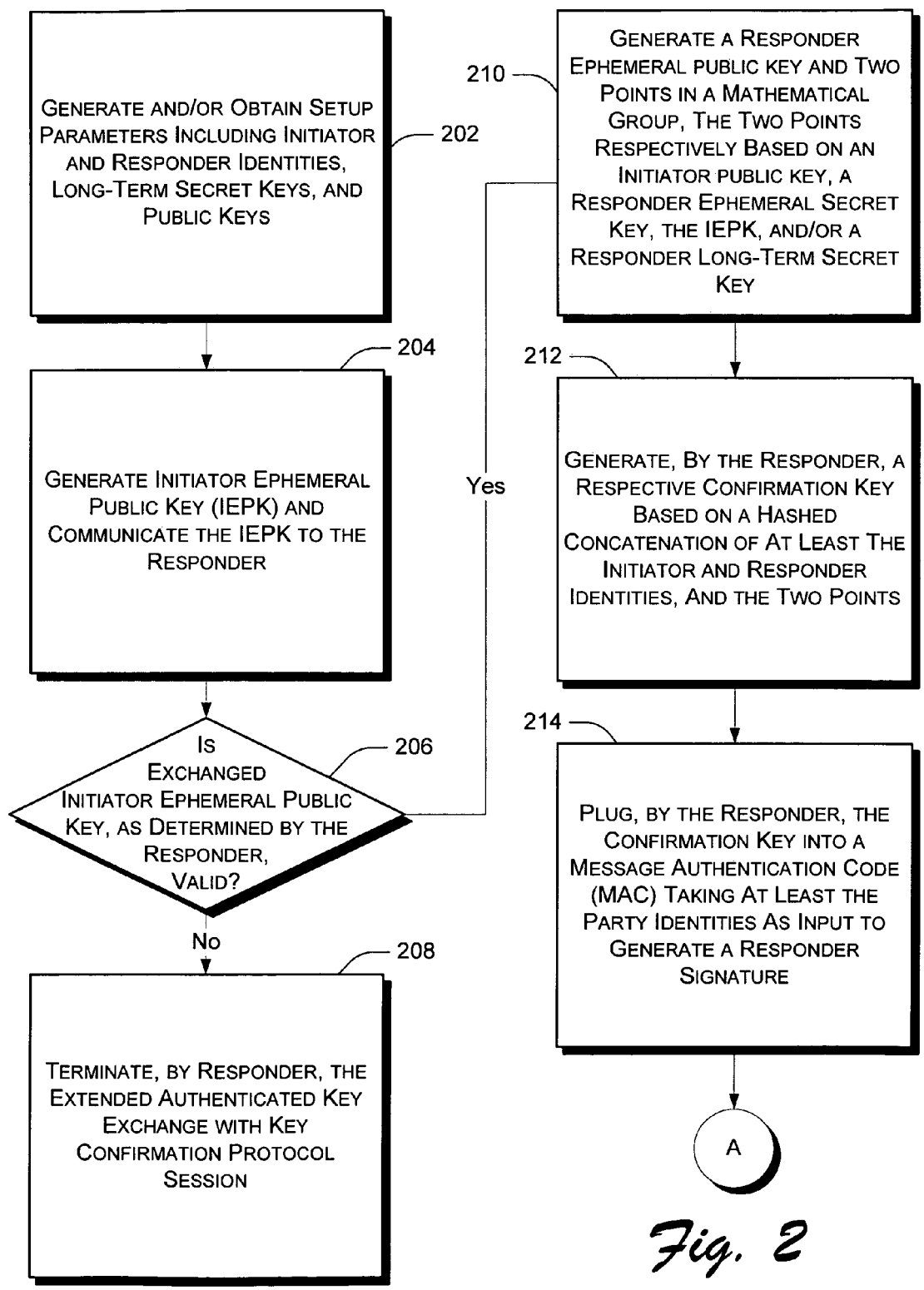
FIG. 2 shows an exemplary procedure for extended authenticated key exchange with key confirmation.

FIGS. 2 through 5 show operations of an exemplary procedure 200 for extended authenticated key exchange with key confirmation. For purposes of discussion and exemplary illustration, operations of this procedure are described with respect to components of FIG. 1. The left-most digit of a component reference number identifies the particular figure in which the component first appears. Referring to FIG. 2, block 202, the extended authenticated key exchange with key confirmation program modules 112 and 116, which are respectively associated with an initiator and a responder, generate and/or obtain setup parameters (as shown above in TABLES 1 and/or 2) to implement extended authenticated key exchange with key confirmation operations. The setup parameters associated with KEA+C operations are directed to extended authenticated key exchange with key confirmation using a group of natural numbers modulo a fixed prime number. The setup parameters associated with EC-KEA+C operations are directed to extended authenticated key exchange with key confirmation operations using a group of points on an elliptic curve of prime order.

At block 204, initiator 102 (i.e., program module 112) generates an initiator ephemeral public key X and communicates X to the responder 106 (i.e., program module 116). At block 206, responder 106 determines whether the received initiator ephemeral public key X is valid. If not, the procedure 200 continues at block 208, wherein the responder 106 terminates the extended authenticated key exchange with key confirmation protocol session. Otherwise, if the received initiator ephemeral public key is determined to be valid, the operations of procedure 200 continue at block 210.

At block 210, the responder 106 computes a responder ephemeral public key Y and two points ($Z_1$ and $Z_2$) in a mathematical group. In this implementation, $Z_1$ is computed based at least on the initiator's public-key (A) and the responder's ephemeral secret key (y). As described above, the mathematical group for KEA+C is a group of natural numbers modulo a fixed prime number. In KEA+C, $Z_1 = A^y \bmod p$.

Whereas in EC-KEA+C, the mathematical group is a group of points on an elliptic curve of prime order. In EC-KEA+C, $Z_1$=yA. In this implementation, $Z_2$ is computed based at least on the responder's long-term secret key (b) and the initiators ephemeral public key (X). In KEA+C, $Z_2=X^b$ mod p. In EC-KEA+C, $Z_2$=bX.

At block 212, the responder 106 generates a respective confirmation key L based on a hash function H applied to concatenation of at least the initiator and responder identities (i.e., $ID_A$ and $ID_B$) and the two points $Z_1$ and $Z_2$. In one implementation, confirmation key L is computed by applying a hash function H to concatenated values of 0, $Z_1$, $Z_2$, $ID_A$, $ID_B$, and sid. At block 214, the responder plugs the confirmation key L into a message authentication code (MAC) to generate a responder signature $SIG_B$. The MAC takes at least the party identities as input to generate the responder signature. In one implementation, the MAC takes the following values as input: sid, $ID_A$, $ID_B$, Y, and X. The exemplary procedure 200 continues in FIG. 3, at on page reference "A."

Figure 3:
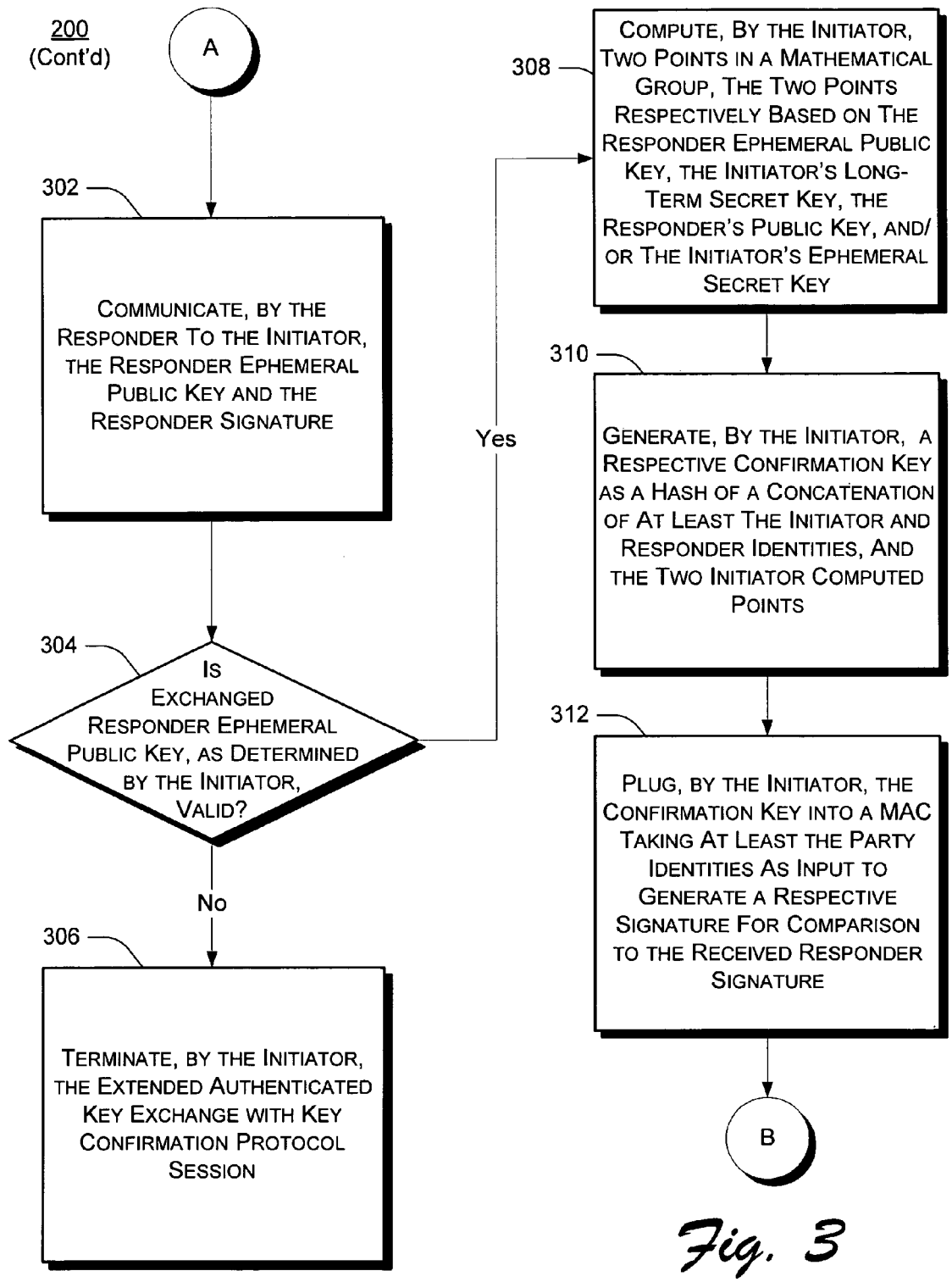
FIG. 3 shows an exemplary procedure for extended authenticated key exchange with key confirmation. More particularly.

Referring to FIG. 3, at block 302, the responder 106 communicates the responder ephemeral public key Y and the responder signature $SIG_B$ to the initiator 102. At block 304, the initiator 102 determines whether the received responder ephemeral public key is valid. If the responder ephemeral public key is determined not valid, operations continue at block 306, where the initiator 102 terminates the extended authenticated key exchange with key confirmation protocol session. If the responder ephemeral public key is valid, operations continue at block 308.

At block 308, the initiator 102 computes to points ($Z_1$ and $Z_2$) in a mathematical group. In this implementation, the initiator computes $Z_1$ based at least on the responder's ephemeral public key (Y) and the initiators long-term secret key (a). As described above, the mathematical group for KEA+C is a group of natural numbers modulo a fixed prime number. In KEA+C, the initiator computes $Z_1=Y^a$ mod p. Whereas in EC-KEA+C, the mathematical group is a group of points on an elliptic curve of prime order. In EC-KEA+C, the initiator computes $Z_1$=aY. In this implementation, the initiator computes $Z_2$ based at least on the responder's public-key (B) and to the initiators ephemeral secret key (x). That is, in KEA+C the initiator computes $Z_2=B^x$ mod p. Whereas, in EC-KEA+C the initiator computes $Z_2$=xB.

At block 310, the responder 102 generates a respective confirmation key L based on a hash function H applied to concatenation of at least the initiator and responder identities (i.e., $ID_A$ and $ID_B$) and the two points $Z_1$ and $Z_2$ that were generated by the initiator (see the operations of block 308). In one implementation, confirmation key L is computed by applying a hash function H to concatenated values of 0, $Z_1$, $Z_2$, $ID_A$, $ID_B$, and sid. At block 312, the initiator plugs the confirmation key L into a message authentication code (MAC) to generate a respective signature for comparison to the received responder signature $SIG_B$. The MAC takes at least the party identities as input to generate the respective signature for comparison. In one implementation, the MAC takes the following values as input: sid, $ID_B$, $ID_A$, X, and Y.

Figure 4:
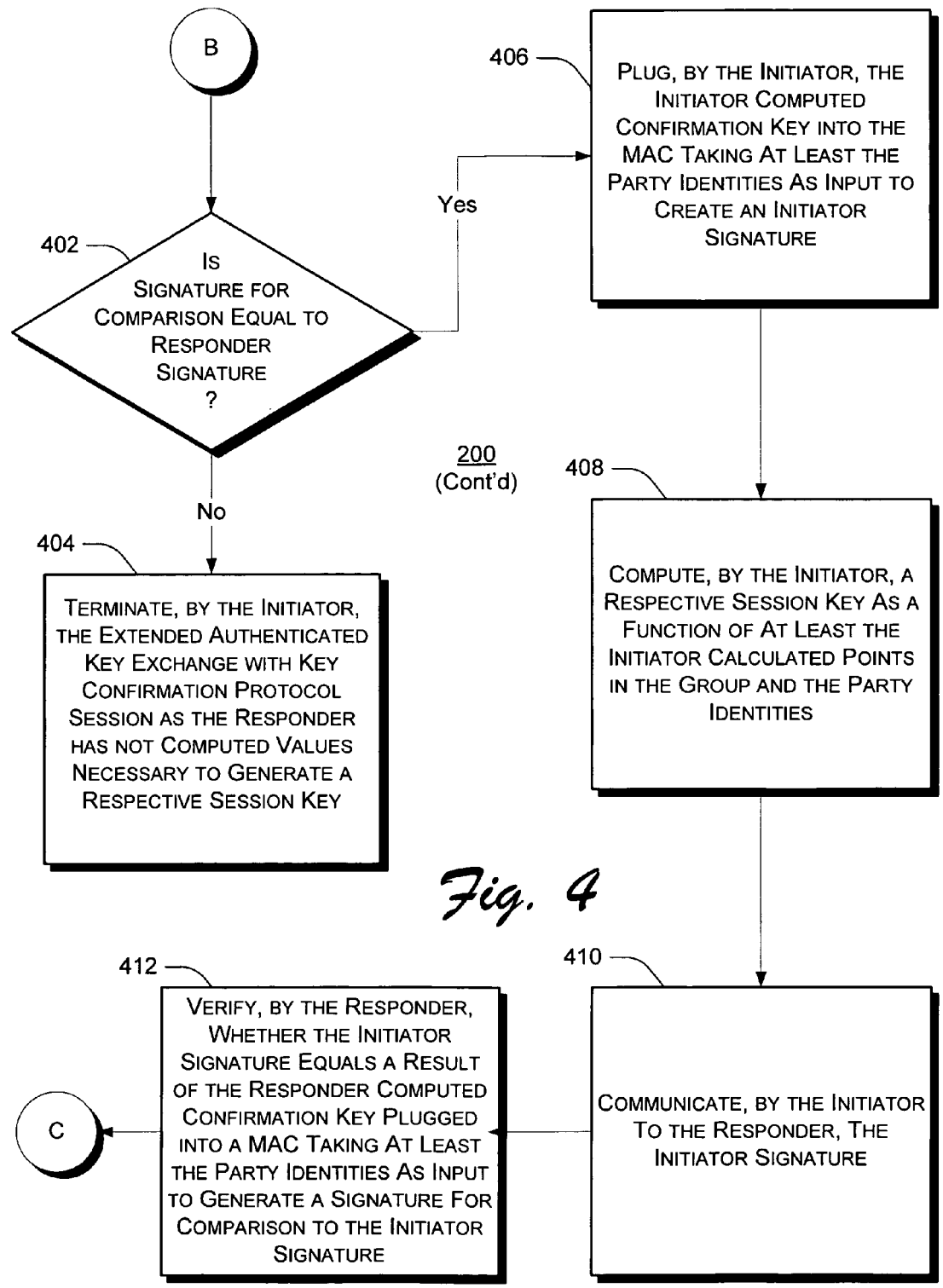
FIG. 4 shows an exemplary procedure for extended authenticated key exchange with key confirmation. More particularly.

The exemplary procedure 200 continues in FIG. 4, at on page reference "B." Referring to FIG. 4, at block 402, the initiator 102 determines whether the computed signature for comparison is equal to the responder signature $SIG_B$. This comparison performs key confirmation. More particularly, the initiator 102 determines whether the responder 106 has actually calculated the necessary values to generate a respective session key for use to exchange information securely with the initiator 102. If the signature for comparison is not equal to the signature $SIG_B$ received from the responder 106, the initiator 102 at block 404, terminates the extended authenticated key exchange with key confirmation protocol session. Because of the respective signatures were not equal, the initiator 102 is not assured that the responder 106 has computed all of the information needed to generate a valid session key for use to exchange information securely with the initiator 102. However, if the signature for comparison is equal to the signature received from the responder 106, operations continue at block 406.

At block 406, the initiator plugs the confirmation key L into the MAC to generate a respective initiator signature $SIG_A$. The MAC takes at least the party identities as input to generate the respective signature for comparison. In this implementation, the MAC takes the following values as input: sid, $ID_A$, $ID_B$, X, and Y. At block 408, the initiator 102 computes a respective session key (i.e., session key 120). The respective session key is computed based at least on the initiator-calculated points in the group and the initiator and responder identities. In FIG. 4, the operations of block 408 are shown as immediately following the operations of block 406. However, in another implementation, the operations of block 408 follow the operations of block 410, which are now described.

At block 410, the initiator 102 communicates the initiator signature $SIG_A$ to the responder 106. This operation is performed to allow the responder 106 to also confirm that the initiator 102 has calculated all the necessary information to actually compute a respective session key (session key 120) for used to exchange information securely with the responder 106. At block 412, responsive to receiving the initiator signature, the responder 106 computes the respective signature for comparison to the initiator signature. More particularly, the responder 106 computes the signature for comparison by plugging the responder computed confirmation key L into the MAC. The MAC takes at least the party identities. The MAC generates the signature for comparison to the initiator signature. At this point, the procedure 200 continues at FIG. 5, on page reference "C."

Figure 5:
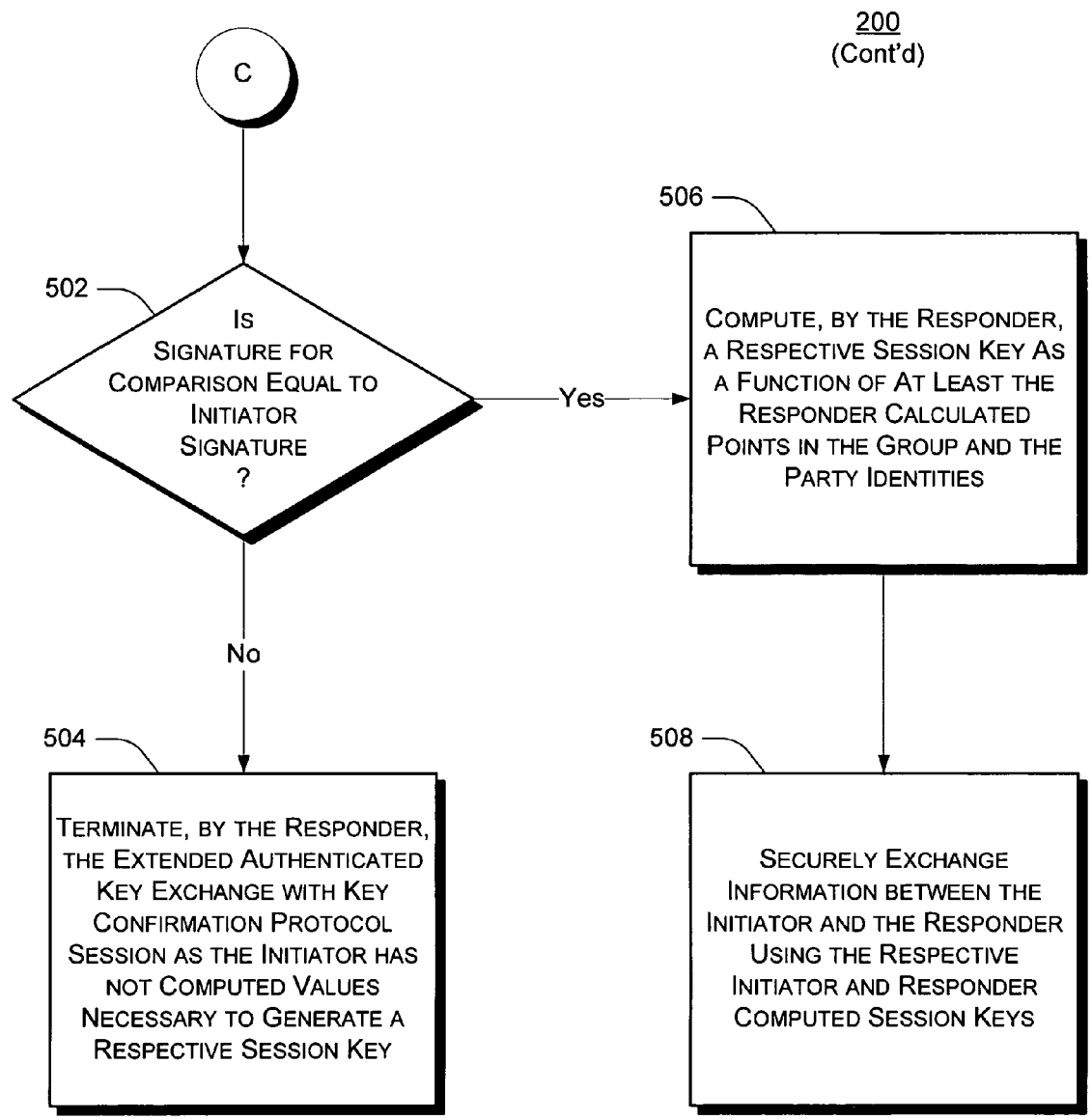
FIG. 5 shows an exemplary procedure for extended authenticated key exchange with key confirmation. More particularly.

Referring to FIG. 5, at block 502 the responder 106 determines whether the computed signature for comparison (see the operations of block 412 of FIG. 4) is equal to the signature $SIG_A$ received from the initiator 102. If the computed signature for comparison is not equal to the initiator's signature, the responder 106 terminates the extended authenticated key exchange with key confirmation protocol session. The session is terminated because the responder 106 is not assured that the initiator 102 has computed the necessary values to generate a valid session key for use to exchange information securely with the responder 106. However, if the signature for comparison is equal to the initiator's signature, the operations of procedure 200 continue at block 506.

At block 506, the responder 106 computes a respective session key (session key 117). In this implementation, the respective session key is based at least on the responder-calculated points in the group ($Z_1$ and $Z_2$) and the party identities ($ID_A$ and $ID_B$). At block 508, the initiator 102 in the responder 106 exchange information securely using the respectively computed session keys (session keys 120 and 117).

An Exemplary Operating Environment

Figure 6:
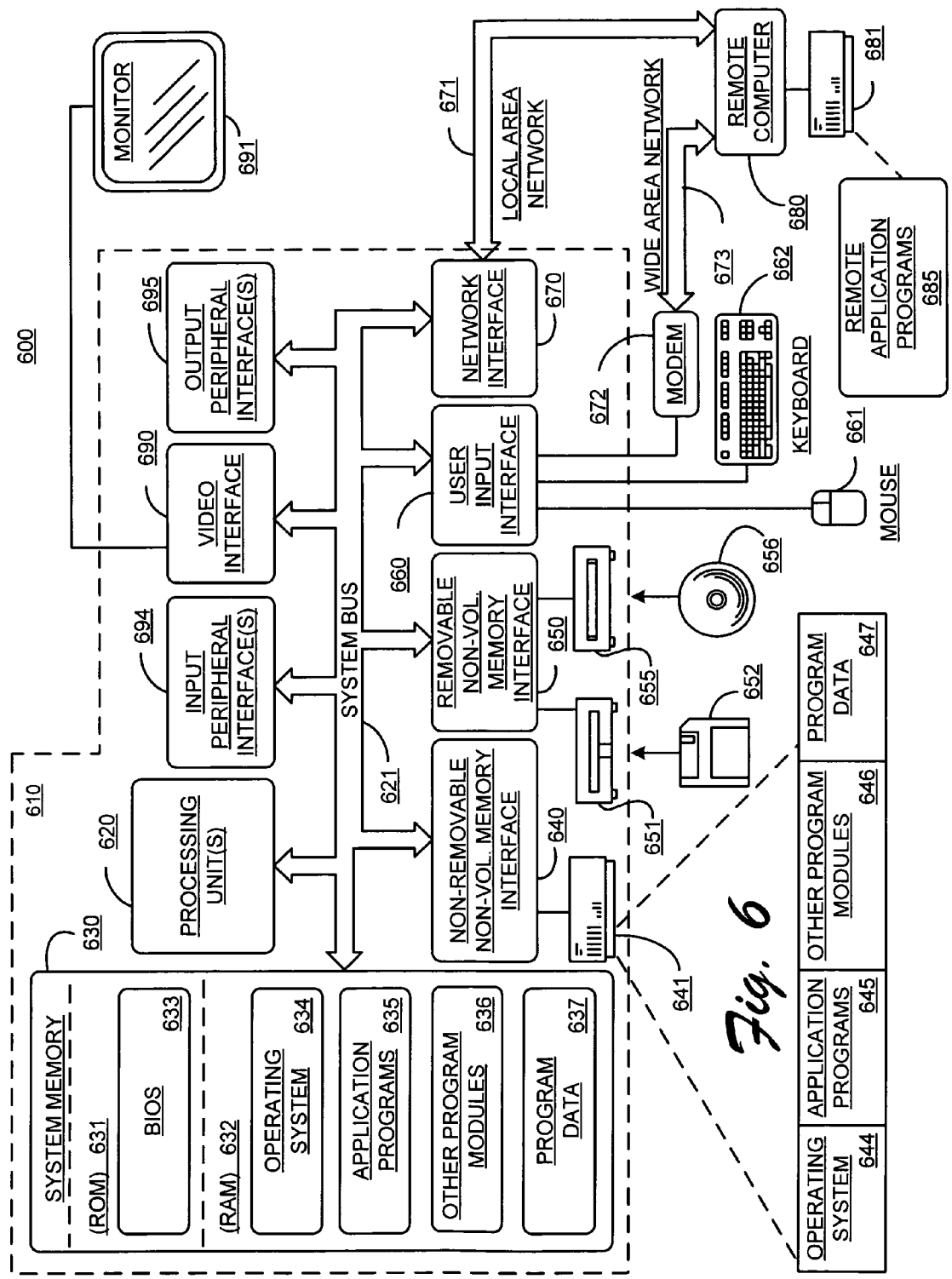
FIG. 6 illustrates an example of a suitable computing environment for implementing (fully or partially) extended authenticated key exchange with key confirmation.

FIG. 6 illustrates an example of a suitable computing environment in which extended authenticated key exchange with key confirmation may be fully or partially implemented. Exemplary computing environment 600 is only one example of a suitable computing environment for the exemplary system 100 of FIG. 1 and exemplary operations of FIGS. 2 through 5, and is not intended to suggest any limitation as to the scope of use or functionality of systems and methods the described herein. Neither should computing environment 600 be interpreted as having any dependency or requirement relating to any one or combination of components illustrated in computing environment 600.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 6, an exemplary system providing extended authenticated key exchange with key confirmation includes a general-purpose computing device in the form of a computer 610 implementing, for example, initiator operations associated with computing device 102 of FIG. 1. Components of computer 610 may include, but are not limited to, processing unit(s) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 610 typically includes a variety of computer-readable media. Computer-readable media can be any available media that can be accessed by computer 610, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that they are at least different copies.

A user may enter commands and information into the computer 610 through input devices such as a keyboard 662 and pointing device 661, commonly referred to as a mouse, trackball or touch pad. Other input devices (not shown) may include a microphone, joystick, graphics pen and pad, satellite dish, scanner, etc. These and other input devices are often connected to the processing unit 620 through a user input interface 660 that is coupled to the system bus 621, but may be connected by other interface and bus structures, such as a parallel port, game port or a universal serial bus (USB). In this implementation, a monitor 691 or other type of user interface device is also connected to the system bus 621 via an interface, for example, such as a video interface 690.

The computer 610 operates in a networked environment using logical connections to one or more remote computers, such as a remote computer 680. In one implementation, remote computer 680 represents computing device 106 of a responder, as shown in FIG. 1. The remote computer 680 may be a personal computer, a server, a router, a network PC, a peer device or other common network node, and as a function of its particular implementation, may include many or all of the elements described above relative to the computer 610, although only a memory storage device 681 has been illustrated in FIG. 6. The logical connections depicted in FIG. 6 include a local area network (LAN) 681 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example and not limitation, FIG. 6 illustrates remote application programs 685 as residing on memory device 681. The network connections shown are exemplary and other means of establishing a communications link between the computers may be used.

CONCLUSION

Although the above sections describe extended authenticated key exchange with key confirmation in language specific to structural features and/or methodological operations or actions, the implementations defined in the appended claims are not necessarily limited to the specific features or actions described. Rather, the specific features and operations of system 100 (FIG. 1) and procedure 200 (FIG. 2) are disclosed as exemplary forms of implementing the claimed subject matter.

The invention claimed is:

1. A computer-implemented method for extended authenticated key exchange with key confirmation protocol using a mathematical group, wherein the method is implemented by a first computing device in communication with a second computing device via a network, the method comprising:
   determining, by the first computing device, an identity of an initiator, an identity of a responder;
   prior to computing session keys for exchange of information between the initiator and the responder, confirming whether the initiator or the responder has received information to compute of a session key of the session keys;
   if a first party on the first computing device comprising one of the initiator or the responder confirms that a second party on the second computing device comprising the other of the initiator or the responder has received the information, generating, by the first party, a session key of the session keys using at least the identities of the initiator and the responder, wherein the session key is calculated by applying a hash function to a concatenation of values including the identity of the initiator and the identity of the responder, and a unique session identifier, wherein the identity of the initiator comprises a first binary string that represents a name of the initiator and the identity of the responder comprises a second binary string that represents a name of the responder;
   if the first party confirms that the second party has not received the information, terminating the extended authenticated key exchange with key confirmation protocol;
   wherein the confirming further comprises:
   computing, by the responder, a key confirmation value based on the mathematical group, registered identities of the initiator and the responder, the unique session identifier, a first element computed from a long-term public key of the initiator and an ephemeral secret key of the responder, and a second element computed from an ephemeral public key of the initiator and a long-term secret key of the responder;
   calculating a responder signature by inputting the key confirmation value, the registered identities of the initiator and the responder, and the unique session identifier, into a message authorization code;
   communicating, by the responder, the responder signature to the initiator, the responder signature for use by the initiator to determine whether the responder has computed information to generate a valid session key.

2. A method as recited in claim 1, wherein the mathematical group is a subgroup of a multiplicative group of natural numbers modulo a prime number, and wherein operations associated with confirming comprise modular exponentiation.

3. A method as recited in claim 1, wherein the mathematical group is a subgroup of the group of points on an elliptic curve, and wherein operations associated with the confirming comprise scalar multiplication in elliptic curve groups.

4. A method as recited in claim 1, wherein the unique session identifier is a unique arbitrary value that is different for every session between the initiator and the responder.

5. A method as recited in claim 1, wherein the confirming further comprises three (3) passes of communication between the initiator and the responder to exchange information to compute the session keys and to confirm to one another that each has properly received corresponding portions of the information.

6. A method of claim 1, wherein the confirming further comprises:
   receiving, by the initiator, the responder signature;
   generating, by the initiator, a signature for comparison to the responder signature, the signature for comparison being generated based on registered identities of the initiator and the responder, the unique session identifier, and elements of the mathematical group, the elements comprising a third element computed from an ephemeral public key of the responder and a long-term secret key of the initiator, wherein the third element is equal to the first element, and a fourth element computed from a long-term public key of the responder and an ephemeral secret key of the initiator, wherein the fourth element is equal to the second element;
   comparing, by the initiator, the signature for comparison to the responder signature; and
   if the signature for comparison is not equal to the responder signature, terminating, by the initiator, the extended authenticated key exchange with key confirmation protocol.

7. A method of claim 6, wherein the confirming further comprises:
   if the signature for comparison is equal to the responder signature, generating an initiator signature by inputting at least the key confirmation value and registered identities of the initiator and the responder and the unique session identifier, into a message authentication code function;
   communicating the initiator signature to the responder for the responder to determine whether the initiator has calculated information to generate a respective session key of the session keys; and calculating, using the first and second elements, the unique session identifier, and identities of the initiator and the responder, a session key of the session keys.

8. Computer-readable storage media having a computer readable program code embodied therein, the computer readable program code adapted to be executed by one or more processors to implement a method for extended authenticated key exchange with session key confirmation protocol using a mathematical group, the method comprising:

prior to establishing a secure channel for exchange of information between an initiator and a responder using respectively computed session keys, confirming that the initiator and the responder have received corresponding information to compute a respective valid session key of the session keys;

terminating, by one or more of the processors, the extended authenticated key exchange with session key confirmation protocol if the initiator or the responder cannot confirm other party receipt of associated portions of the corresponding information;

responsive to determining, by the initiator, that the responder has received the corresponding information, computing, by the initiator, a first session key based at least on determined identities of the responder and the initiator, a unique session identifier, an ephemeral public key of the responder, a long-term secret key of the initiator, a long-term public key of the responder and an ephemeral secret key of the initiator, wherein the identity of the initiator comprises a first binary string that represents a name of the initiator and the identity of the responder comprises a second binary string that represents a name of the responder;

responsive to determining, by the responder, that the initiator has received the corresponding information, computing, by the responder, a second session key based at least on the determined identities of the responder and the initiator, the unique session identifier, a long-term public key of the initiator, an ephemeral secret key of the responder, an ephemeral public key of the initiator and a long-term secret key of the responder; and wherein the first and second session keys are for secure exchange of information between the initiator and the responder.

9. The computer-readable storage media as recited in claim 8, wherein the mathematical group is a subgroup of a multiplicative group of natural numbers modulo a prime number, and wherein operations associated with confirming comprise modular exponentiation.

10. The computer-readable storage media as recited in claim 8, wherein the mathematical group is a subgroup of the group of points on an elliptic curve, and wherein operations associated with the confirming comprise scalar multiplication in elliptic curve groups.

11. The computer-readable storage media as recited in claim 8, wherein the unique session identifier is a unique arbitrary value that is different for every session between the initiator and the responder.

12. The computer-readable storage media as recited in claim 8, wherein the confirming further comprises three (3) passes of communication between the initiator and the responder to exchange information to compute the session keys and to confirm to one another that each has properly received corresponding portions of the information.

13. The computer-readable storage media as recited in claim 8, wherein the confirming further comprises:

computing, by the responder, a key confirmation value based on the mathematical group, registered identities of the initiator and the responder, the unique session identifier, a first element computed from the long-term public key of the initiator and the ephemeral secret key of the responder, and a second element computed from the ephemeral public key of the initiator and the long-term secret key of the responder;

calculating a responder signature using a message authentication code based on the key confirmation value, the unique session identifier, and the registered identities of the initiator and the responder;

communicating, by the responder, the responder signature to the initiator; and wherein the responder signature is for use by the initiator to determine whether the responder has computed information to generate a valid corresponding session key of the session keys.

14. The computer-readable storage media as recited in claim 8, wherein confirming further comprises:

receiving, by the responder, an initiator signature;

generating, by the responder, a signature for comparison to the initiator signature, the signature for comparison being generated using a key confirmation value input into a message authentication code function, the key confirmation value being based on elements in the mathematical group, the unique session identifier, and registered identities of the initiator and the responder, the elements comprising a first element computed from the long-term public key of the initiator and the ephemeral secret key of the responder, and a second element computed from the ephemeral public key of the initiator and the long-term secret key of the responder;

comparing, by the responder, the signature for comparison to the initiator signature to determine if they are equal, the initiator signature being generated by the initiator based on registered identities of the initiator and the responder, the unique session identifier, and elements of the mathematical group, the elements comprising a third element computed from the ephemeral public key of the responder and the long-term secret key of the initiator, wherein the third element is equal to the first element, and a fourth element computed from the long-term public key of the responder and the ephemeral secret key of the initiator, wherein the fourth element is equal to the second element; and if the signature for comparison is not equal to the initiator signature, determining, by the responder, that the initiator has not received the corresponding information to generate a session key.

15. The computer-readable storage media as recited in claim 8, wherein confirming further comprises:

receiving, by the initiator, a responder signature generated based on registered identities of the initiator and the responder, the unique session identifier, and elements of the mathematical group, the elements comprising a first element computed from the long-term public key of the initiator and the ephemeral secret key of the responder, and a second element computed from the ephemeral public key of the initiator and the long-term secret key of the responder;

generating, by the initiator, a signature for comparison to the responder signature, the signature for comparison being generated using a key confirmation value input into a message authentication code, the key confirmation value being based on registered identities of the initiator and the responder, the unique session identifier, and elements in the mathematical group, the elements comprising a third element computed from the ephemeral public key of the responder and the long-term secret key of the initiator, wherein the third element is equal to the first element, and a fourth element computed from the long-term public key of the responder and the ephemeral secret key of the initiator, wherein the fourth element is equal to the second element;

comparing, by the initiator, the signature for comparison to the responder signature to determine if they are equal; and if the signature for comparison is not equal to the responder signature, determining, by the initiator, that the responder has not received the corresponding information to generate a session key of the first and second session keys.

16. The computer-readable storage media as recited in claim 15, wherein the confirming further comprises:

if the signature for comparison is equal to the responder signature, generating an initiator signature by inputting at least the key confirmation value, the unique session identifier, and registered identities of the initiator and the responder into a message authentication code function;

communicating the initiator signature to the responder for the responder to confirm whether the initiator has received the corresponding information; and calculating, by the initiator, using the third and fourth elements, the unique session identifier, and identities of the initiator and the responder, a session key of the first and second session keys.

17. A computing device for implementing an extended authenticated key exchange protocol, the computing device comprising:

a processor;

a memory coupled to the processor, the memory containing processor-executable instructions for configuring the processor as an initiator to send an initiator's ephemeral public key over a network to a responder at another computing device during initiating of a session key for the authenticated key exchange protocol, wherein the responder has knowledge of the initiator's long-term public key, wherein the initiator has knowledge of the responder's long-term public key, wherein the responder has a long-term secret key upon which the responder's long-term public key is based, wherein the initiator has a long-term secret key upon which the initiator's long-term public key is based, wherein the initiator and the responder each have knowledge of the initiator's identity as a first binary string and the responder's identity as a second binary string;

wherein, in response to sending the initiator's ephemeral public key, the processor is configured to receive from the responder a responder's ephemeral public key and a responder's signature, wherein the responder's signature is a message authentication code (MAC) computed value generated using a secret confirmation key, wherein the secret confirmation key is determined by the responder based on a concatenation of the identity of the initiator, the identity of the responder, a unique session identifier, and a first element computed from the initiator's long-term public key and a responder's ephemeral secret key used to determine the responder's ephemeral public key, and a second element computed from the initiator's ephemeral public key and the responder's long-term secret key;

wherein the processor is configured to verify the responder's ephemeral public key and the responder's signature, wherein verifying the responder's signature includes determining the secret confirmation key based on a concatenation of the identity of the initiator, the identity of the responder, the unique session identifier, and a third element computed from the responder's ephemeral public key and the initiator's long-term secret key, wherein the third element is equal to the first element, and a fourth element computed from the responder's long-term public key and an initiator's ephemeral secret key used to determine the initiator's ephemeral public key, wherein the fourth element is equal to the second element;

wherein the processor is configured to send an initiator's signature to the responder, wherein the responder's signature is a MAC computed value generated using the secret confirmation key;

wherein, following verification of the responder's ephemeral public key and the responder's signature, the processor is configured to generate a valid session key to exchange information securely with the responder, the responder having a corresponding session key generated following receipt and verification of the initiator's ephemeral public key and initiator's signature;

wherein the initiator's session key is generated based on a calculation including at least the identities of the initiator and the responder, the unique session identifier, and the third and fourth elements; and wherein the responder's session key is generated based on a calculation including at least the identities of the initiator and the responder, the unique session identifier, and the first and second elements.

* * * * *